R. WHITE.
IRRIGATING DEVICE FOR PLANTS.
APPLICATION FILED APR. 16, 1917.
1,247,766.
Patented Nov. 27, 1917.
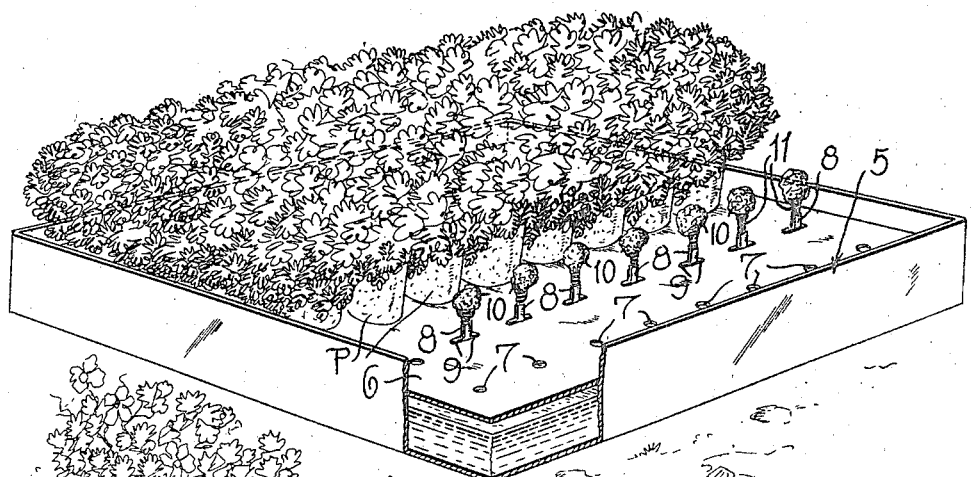
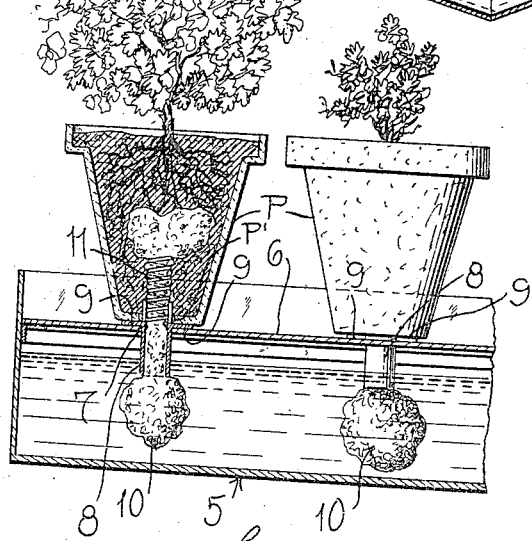
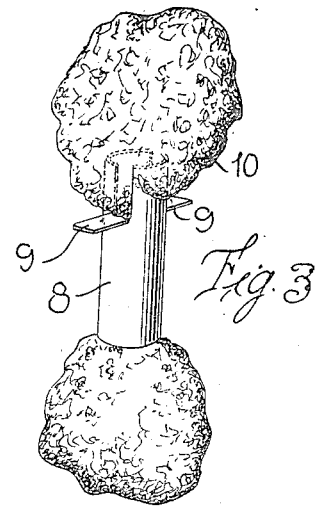
Inventor
ROY WHITE
By Watson E. Coleman
Attorney

UNITED STATES PATENT OFFICE.

ROY WHITE, OF LAMAR, COLORADO, ASSIGNOR OF THREE-EIGHTHS TO JAMES K. DOUGHTY, OF LAMAR, COLORADO, AND ONE-EIGHTH TO CHARLES L. DOUGHTY, OF CINCINNATI, OHIO.

IRRIGATING DEVICE FOR PLANTS.

1,247,766. Specification of Letters Patent. Patented Nov. 27, 1917.

Application filed April 16, 1917. Serial No. 162,404.

*To all whom it may concern:*

Be it known that I, ROY WHITE, a citizen of the United States, residing at Lamar, in the county of Prowers and State of Colorado, have invented certain new and useful Improvements in Irrigating Devices for Plants, of which the following is a specification, reference being had to the accompanying drawings.

This invention relates to an improved irrigating device for plants, and has for its primary object to provide certain improvements in my original invention shown and described in Patent No. 1,216,642, granted to me February 20, 1917.

It is one of the particular objects of the present invention to provide a water receptacle or pan having a top wall provided with spaced openings therein, tubes removably mounted in the openings and adapted to project at their upper ends through openings in the base wall of the flower pots arranged upon the top wall of the pan, said tubes being held in place by the flower pots, and an absorbent material projecting through the tube and beyond its opposite ends to absorb water contained in the pan and supply the same to the earth surrounding the roots of the plants.

The present invention also has for a specific item or improvement to provide a binding wire engaged upon the absorbent material at its upper end to render the same relatively stiff so that the material will not be laterally displaced when the flower pot is arranged in position on the top wall of the pan or removed therefrom.

And it is a further object of my invention to provide improvements in my original device as above noted, which, however, will not add to any material extent to the manufacturing cost of the article, while greatly increasing its serviceability and efficiency in practical use.

With the above and other objects in view, my invention consists in the novel features of construction, combination and arrangement of parts to be hereinafter more fully described, claimed and illustrated in the accompanying drawing, in which, Figure 1 is a perspective view of a water pan or receptacle showing several plant containers or pots arranged thereon;

Fig. 2 is an enlarged vertical section; and

Fig. 3 is a detail perspective view of one of the removable tubes for the absorbent material.

Referring in detail to the drawing, 5 designates the water pan or receptacle which may be of any desired dimensions and is provided with a top wall 6 which may either be fixed to the inner sides of the marginal walls of the pan or removably supported thereon, as preferred. This top wall 6 is provided with a plurality of openings 7 equidistantly spaced apart, and within these openings the removable sheet metal tubes 8 are adapted to be arranged.

Each of the tubes 8, at one of its ends and at diametrically opposite points, is longitudinally split and the metal forced outwardly to provide the laterally projecting arms 9. The tubes are arranged in the openings 7 with the longer portions thereof extending downwardly into the pan and the arms 9 disposed upon the upper surface of the top wall 6.

10 designates a length of sponge or other suitable absorbent material extending through the tube 8 and beyond the opposite ends thereof. The sponge projecting below the lower end of the tube is engaged in the water contained in the receptacle 5. A relatively long section of the sponge extends above the upper end of the metal tube 8, and upon the same a binding wire 11 is spirally coiled, one end of said wire being engaged within the end of the tube 8 and preferably soldered to the wall thereof. This binding wire renders the upwardly projecting portion of the absorbent sponge relatively rigid so that it will not droop over laterally but will at all times be held in an erect vertical position immediately above the opening in the top wall of the pan or receptacle 5.

P designates the holder or pot for the plant which may be of any suitable capacity and is adapted to be arranged upon the top wall 6 of the pan immediately over one of the openings 7 therein. This flower pot is provided in its bottom wall with the usual central opening P' through which the rigid upper end portion of the sponge 10 and the upper end of the tubes 8 are adapted to project. Of course, it is manifest that, if desired, the portion of the sponge or absorbent material projecting above the upper end of the tubes 8 may be relatively short and the use of binding wire dispensed with, as indicated in Fig. 3 of the drawing.

In the practical operation of the device, it will be understood that the water contained in the pan or receptacle 5 is absorbed by the sponge or other absorbent material and, by capillary attraction, drawn upwardly and disseminated through the earth in the bottom of the pot and around the plant roots. Thus the moisture is automatically and continuously supplied to the plant so as to facilitate the growth thereof, and frequent replenishing of the water and much care and attention which is ordinarily required, is thereby obviated. The top wall of the pan is preferably disposed some distance below the upper edges of the marginal walls as in the original form of the device shown in my issued patent, so that any excess of water will drain through the opening in the bottom of the pot and collect upon the top wall of the pan. Thus, when the pots and the metal tubes are removed, this water may freely drain back through the openings 7 into the pan or receptacle.

From the foregoing description, taken in connection with the accompanying drawing, it is believed that the construction, manner of operation and several advantages of my invention will be clearly and fully understood. By removably mounting the metal tubes 8 in the top wall of the pan, a new length of sponge or other absorbent material may be readily engaged through the tube. The flower pot resting upon the laterally projecting arms 9 of the tube, hold the same in place while the upper end of the tube being disposed through the opening in the base wall of the pot, prevents lateral displacement of the flower pot upon the wall of the pan or receptacle. When desired, the flower pots or holders can be readily removed for the purpose of supplying additional soil or earth, and when replaced, the relatively stiff or rigid, upwardly projecting portion of the absorbent material may be easily engaged through the opening in the bottom wall of the pot and the pot again arranged in position upon the receptacle wall. The downward movement of the tubes 8 is, of course, limited by the engagement of their arms 9 upon the wall of the pan when the pot or holder is arranged in position. The device as a whole is exceedingly simple in its construction and, in practical use, has been found very reliable and efficient for the purpose in view. As above noted, it is manifest that the pan or receptacle 5 can be of any desired size and also of various other shapes than that illustrated in the drawing. This receptacle may likewise be made of clay or other materials in lieu of sheet metal.

While I have herein shown and described the preferred construction and arrangement of the several parts, it is to be understood that the device is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. An irrigating device for plants including a water receptacle having a top wall provided with spaced openings over which the plant pots are adapted to be arranged, a metal tube adapted to be removably engaged in each of said openings and having stop lugs adjacent one of its ends to engage the top wall of the receptacle and limit the downward movement of the tube through the opening, the upper end of the tube being adapted to extend through an opening in the bottom wall of the pot, and a length of absorbent material engaged through the tube and extending below the lower end thereof into the water in the receptacle and extending above the upper end of the tube into the pot.

2. An irrigating device for plants including a water receptacle having a top wall provided with spaced openings over which the plant pots are adapted to be arranged, a metal tube adapted to be removably engaged in each of said openings, stop lugs struck outwardly from the wall of the tube at one of its ends to engage the top wall of the receptacle and limit the downward movement of the tube through the opening, the upper end of the tube being adapted to extend through an opening in the bottom wall of the pot, and a length of absorbent material engaged through the tube and extending below the lower end thereof into the water in the receptacle and extending above the upper end of the tube into the pot.

In testimony whereof I hereunto affix my signature in the presence of two witnesses.

ROY WHITE.

Witnesses:
CLARENCE A. COKER,
NELL RYBURN.